United States Patent
Seok et al.

(10) Patent No.: US 11,723,070 B2
(45) Date of Patent: Aug. 8, 2023

(54) SIGNALING INDIVIDUALIZED TRANSMISSION DURATION THRESHOLD FOR RTS/CTS

(71) Applicant: MediaTek Singapore Pte. Ltd., Singapore (SG)

(72) Inventors: Yongho Seok, San Jose, CA (US); Chao-Chun Wang, San Jose, CA (US); James Chih-Shi Yee, San Jose, CA (US)

(73) Assignee: Mediatek Singapore PTE. LTD, Singapore (SG)

(*) Notice: Subject to any disclaimer, the term of this patent is extended or adjusted under 35 U.S.C. 154(b) by 37 days.

(21) Appl. No.: 17/356,154

(22) Filed: Jun. 23, 2021

(65) Prior Publication Data

US 2021/0321458 A1    Oct. 14, 2021

Related U.S. Application Data

(63) Continuation of application No. 16/284,426, filed on Feb. 25, 2019, now Pat. No. 11,076,425.

(60) Provisional application No. 62/637,420, filed on Mar. 2, 2018.

(51) Int. Cl.
*H04W 74/08*    (2009.01)
*H04W 74/00*    (2009.01)
*H04W 76/14*    (2018.01)
*H04W 84/12*    (2009.01)
*H04W 88/08*    (2009.01)
*H04W 72/1263*  (2023.01)

(52) U.S. Cl.
CPC .... *H04W 74/0816* (2013.01); *H04W 72/1263* (2013.01); *H04W 74/002* (2013.01); *H04W 76/14* (2018.02); *H04W 88/08* (2013.01); *H04W 84/12* (2013.01)

(58) Field of Classification Search
CPC ............................. H04W 76/14; H04W 84/12
USPC ........................................................ 370/329
See application file for complete search history.

(56) References Cited

U.S. PATENT DOCUMENTS

2013/0083684 A1* 4/2013 Yeh .......................... H04W 8/26
                                                       370/252
2019/0274166 A1* 9/2019 Seok ..................... H04W 76/14

* cited by examiner

*Primary Examiner* — Angel T Brockman

(57) ABSTRACT

System and method of using an AP to individually controlling RTS/CTS duration thresholds for multiple STAs in a WLAN. In response to a STA's association request, the AP determines a duration threshold specific to the STA and encloses this information in an association request response for transmission to the STA. By using a broadcast frame, the AP may instruct multiple STAs to uniformly update their stored duration thresholds. For example, if the duration threshold field in the beacon frame is set to 0, the multiple STAs preserve their current duration thresholds; if the field is set to a non-zero value less than 1023, the multiple STAs all update their duration thresholds to the non-zero value; if this field is set to 1023, the multiple STAs disable the RTS/CTS transmissions. Based on a current threshold and pertinent policies, an STA can decide whether to initiate an RTS/CTS transmission sequence.

20 Claims, 7 Drawing Sheets

SIGNALING INDIVIDUALIZED TRANSMISSION DURATION THRESHOLD FOR RTS/CTS

CROSS REFERENCE TO RELATED APPLICATION

This patent application is a continuation of and claims priority and benefit to copending U.S. patent application Ser. No. 16/284,426, filed Feb. 25, 2019, which claims priority and benefit of U.S. Provisional Patent Application No. 62/637,420, entitled "HE DURATION-BASED RTS," filed on Mar. 20, 2018, the entire contents of which are herein incorporated by reference for all purposes.

TECHNICAL FIELD

Embodiments of the present disclosure relate generally to the field of network communication, and more specifically, to the field of communication protocols used in wireless communication.

BACKGROUND OF THE INVENTION

In a wireless network, a hidden node problem refers to the situation in which a node can communicate with a second node, (e.g., a wireless access point (AP)) but cannot directly communicate with other nodes that are communicating with the second node. This leads to difficulties in the media access control sub-layer since multiple nodes may send data packets to the second node simultaneously, causing interference at the second node such that neither packet can get through. A dense communication environment is prone to this hidden node problem.

Request to Send/Clear to Send (RTS/CTS) as implemented WLANs provides a solution to the hidden node problem by requiring handshaking between a source and a destination node. Prior to sending a packet, a source node sends an RTS frame and awaits a CTS frame from the destination node. The exchange of RTS/CTS can ensure that the channel is clear in the area of the destination node. Every node within the range of the CTS can reliably receive the CTS, even if they cannot hear the RTS due to attenuation. The RTS and CTS frames include information regarding the size of the data packet being transmitted so that other nodes know how long the transmission is likely to last. Thus all nodes avoid accessing the channel after hearing the CTS even if the carrier sensor at the node indicates that the medium is free. As a result, frame collision can be prevented.

In dense communication environments, managing RTS/CTS usage by an AP can effectively alleviate the overall interference situation since the AP usually has a better view of the interference situation. To improve spectrum utilization, duration-based RTS/CTS usage is preferred over length-based. That is, the size of the data packet is indicated by the expected duration rather than the data unit length.

Typically, the RTS/CTS transmission is an optional feature in wireless communication protocols, which is configured to be used for packets exceeding a specified size, e.g., a duration threshold for RTS data transmission. Conventionally, the AP sets the duration threshold for all the associated STAs in the Basic Service Set (BSS) in a broadcast manner. Accordingly, the STAs update their respective duration threshold parameter based on the most recent setting received from the AP. For example, the AP may include the duration threshold setting in a beacon, an association response, a reassociation response or a probe response. In this way, regardless of the interference levels and their different needs for RTS/CTS transmissions, the receive STAs must use the same duration threshold to determine whether to initiate an RTS/CTS transmission sequence. Therefore, the usage of RTS/CTS transmission cannot be customized for individual STAs.

SUMMARY OF THE INVENTION

Accordingly, systems and methods disclosed herein provide effective communication protocols to enable flexible assignments of varying TXOP duration thresholds to individual stations (STAs) for RTS/CTS transmissions in a wireless local area network (WLAN), thereby enhancing spectral usage efficiency of the network.

Embodiments of the present disclosure include using a management frame destined to an individual STA to assign an individualized RTS/CTS TXOP duration threshold for the STA, and then using a management frame destined to multiple STAs to instruct them whether to preserve their individualized duration thresholds or to update to a common duration threshold. More specifically, in response to an association request from a specific STA, the AP transmits an association request response frame only to the STA, which specifies a customized duration threshold for the STA in a duration threshold field. Thus, multiple STAs can be assigned with different duration thresholds. A subsequent beacon frame transmitted from the AP and destined to the multiple STAs, or any other management frame, also contains a duration threshold field. If this field is set to a first prescribed constant (e.g., "0"), the multiple STAs preserve their current duration thresholds; if this field is set to a non-zero value less than a second prescribed value, the multiple STAs all update their duration thresholds to the non-zero value; if this field is set to a second prescribed value (e.g., a maximum value), the multiple STAs disable the RTS/CTS transmissions.

Based on a current duration threshold and other pertinent policies, an STA can decide whether to initiate an RTS/CTS transmission sequence. For example, an STA may determine that it is mandatory to initiate such a transmission if the following two conditions are met: (1) individually addressed frames are to be transmitted to the AP or to a Tunnel Direct Link Setup (TDLS) peer STA; and (2) the expected TXOP duration is greater than the duration threshold.

According to embodiments of the present disclosure, an AP can individually signal each associated STA with regard to an RTS/CTS TXOP duration threshold by using an association response frame. The duration threshold for an STA may be determined based on any suitable factors, such as a classification of the STA, an interference level the STA usually experiences, and the extent of the hidden node problem to the STA. By individually controlling the duration thresholds, RTS/CTS usage by individual STAs in a WLAN can be advantageously flexibly and specifically controlled to achieve improved spectrum usage efficiency as well as interference mitigation.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Figure 1:
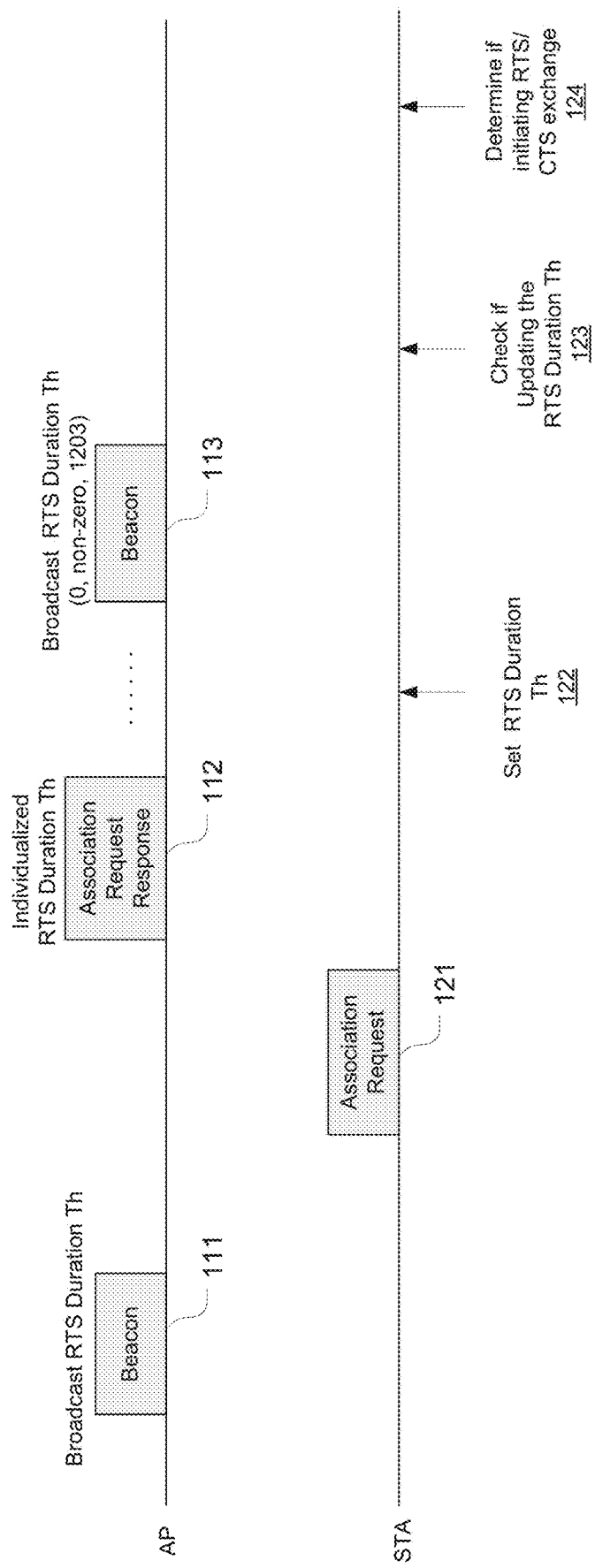
FIG. 1 is a timing diagram that illustrates an exemplary process of exchanging messages between an AP and an STA to set an individualized duration threshold of an RTS/CTS TXOP for the particular STA in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Signaling Individualized Transmission Duration Threshold for RTS/CTS

Embodiments of the present disclosure are described in detail with reference to the formats and structures of Physical Layer Convergence Protocol (PLCP) protocol data unit (PPDUs), data frames, control frames and management frames as defined in the high efficiency (HE) WLAN-based IEEE 802.11 family of Specifications and Standards. However, the present disclosure is not limited to any specific transmission formats or structures, nor limited to any specific industry standards or specifications.

Embodiments of the present disclosure provide RTS/CTS communication protocols that enable an access point (AP) to set varying TXOP RTS/CTS duration thresholds for different STAs and individually signal the STAs about the thresholds. Accordingly, an STA may use a customized duration threshold to determine whether to initiate RTS/CTS transmissions. More specifically, in response to a STA's association request, the AP determines a duration threshold specific to the STA and encloses this information in an association request response for transmission to the STA. The STA stores the received threshold which may be modified according to a subsequent instruction from the AP. In some embodiments, by using a broadcast management frame, the AP may instruct multiple STAs to uniformly update their stored duration thresholds to a value as specified in the management frame. For example, in a beacon frame that is destined to the multiple STAs, the AP specifies a non-zero value in a duration threshold field therein. The duration threshold field of the beacon frame is also defined to carry two other alternative indications to the multiple STAs, which include: no update on the duration threshold; and disabling RTS/CTS transmissions. As a result, an STA may use the current duration threshold stored therein to determine whether initiating an RTS/CTS transmission opportunity is mandatory according to a set of prescribed policies governing RTS/CTS transmissions.

FIG. 1 is a timing diagram that illustrates an exemplary process of exchanging messages between an AP 110 and an STA 120 to set an individualized duration threshold of an RTS/CTS TXOP for the particular STA in accordance with an embodiment of the present disclosure. The AP 110 periodically broadcasts beacon frames, e.g., frames 111 and 113, which can be received and resolved by a plurality of STAs of the same Basic Service Set (BSS). The beacon frame announces the existence of the network and allows STAs to find and identify the network as well as match parameters for joining the network.

For example, in compliance with an IEEE 802.11 family standard, each STA maintains a duration threshold parameter "dot11TXOPDurationRTSThreshold" to store the duration threshold value. However, the present disclosure is not limited to any specific protocol, means or parameter that an STA maintains its RTS/CTS TXOP duration threshold. For each STA, the current value of the duration threshold parameter may be acquired from a previous broadcast management frame (e.g., a previous beacon frame) or an individualized control frame (e.g., a previous association request response frame), as described in greater detail below.

The beacon frame 111 includes a duration threshold field that may carry one of 3 indications operable to cause 3 possible scenarios of the receive STAs. Since the beacon frame 111 is transmitted in a broadcast manner, the indication in the duration threshold field therein causes the plurality of receive STAs to act, or refrain from acting, uniformly. More specifically, when the duration threshold field in the beacon frame indicates a first prescribed constant value (e.g., "0"), each receive STA preserves the values of the duration threshold parameter without update. When the duration threshold field in the beacon frame indicates a second prescribed constant value (e.g., a maximum value "1023"), each receive STA disables RTS/CTS transmissions. When the duration threshold field in the beacon frame specifies a value that is different than the first and the second prescribed value (e.g., a non-zero value that is less than 1023), each receive STA updates its duration threshold parameter to the specified non-zero value.

In response to the beacon frame 111, a new STA 120 identifies the compatible network, authenticates to it, and sends an association request frame 121 to the AP 110 in attempt to join the BSS. The AP replies to the STA 121 with an association request response frame 112 which specifies an association ID. According to embodiments of the present disclosure, the AP determines a duration threshold that is customized for the particular STA 120 based on one or more factors, such as its classification and characteristics, an interference level it usually experiences, and the extent of the hidden node situation that the STA potentially experiences. It will be appreciated that the present disclosure is not limited to any specific mechanism, algorithms, processes, policies or factors that an AP uses to determine a customized duration threshold for a particular STA or a particular group of STAs.

The association request response frame 112 is transmitted to the STA 120, specifying the individualized duration threshold. Upon receiving the association request response frame 112, the STA 120 sets its duration threshold parameter to the specified value at step 122, e.g., parameter "dot11TXOPDurationRTSThreshold." As the association request response frame 112 is directed only to the requesting STA 120, the duration threshold specified in the frame 112 would not affect other STAs.

Thus, the AP can individually control the RTS/CTS TXOP duration threshold of an associated STA and signal the duration threshold to the STA by using an association response frame. In this manner, RTS/CTS usage for an individual STA in a WLAN can be advantageously flexibly and specifically controlled, thereby improving spectrum usage efficiency as well as interference mitigation.

Similar with the beacon frame 111, a subsequent beacon frame 113 is broadcast to multiple STAs including the newly associated STA 120. The beacon frame 113 also includes the duration threshold field that may indicate "0," "1023" or a non-zero value, as described above. In response to the beacon frame 113, the STA 120, as well as other STAs that receive the frame 113, checks if it needs to update its duration threshold parameter at step 123. If the duration threshold field in the beacon frame 113 indicates "0," the parameter is not updated and therefore preserves the individualized value as set in step 122. If the field in the beacon frame 113 indicates "1023," the STA disables RTS/CTS transmissions. If the field indicates a non-zero value that is smaller than 1023, the duration threshold parameter is updated to the non-zero value.

Based on the current value of the duration threshold parameter, at step 124, the STA 120 determines whether to initiate an RTS/CTS transmission. In some embodiments, initiating an RTS/CTS transmission opportunity is mandatory so long as a set of conditions are met. However, it will be appreciated that the present disclosure is not limited to any specific objective, application, logic or algorithm of using a value of the duration threshold by the STA.

Embodiments of the present disclosure described in detail use a beacon frame to broadcast a duration threshold setting which may cause the STAs to update their duration threshold parameters, such as changing from an individualized duration threshold to a specified value that is common to all the receive STAs. However, any other suitable type of management frames that are well known in the art can be used to broadcast a duration threshold setting to the STAs without departing from the scope of the present disclosure.

Figure 2:
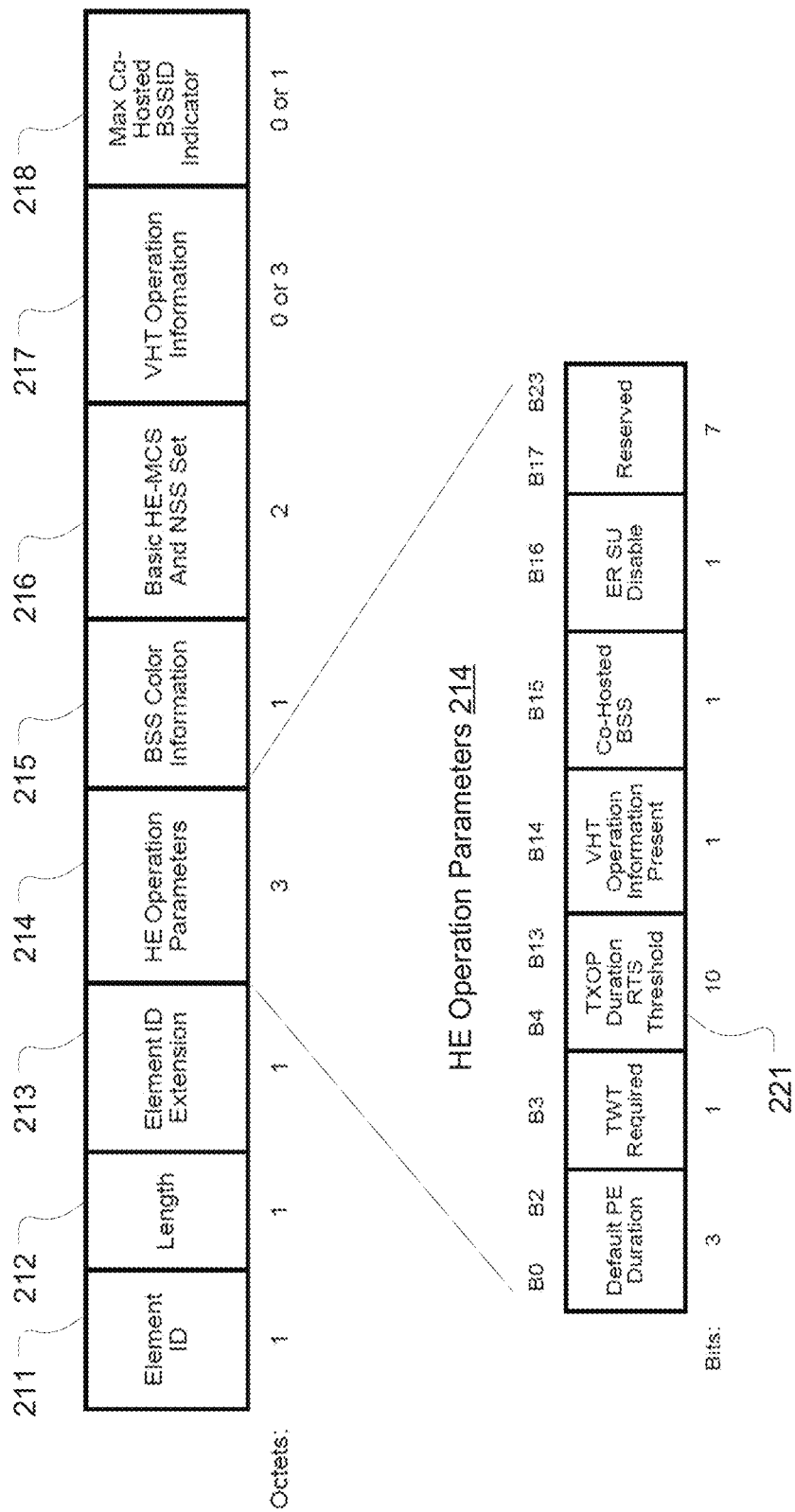
FIG. 2 illustrates an exemplary format of a management frame that includes a subfield in an "HE operation element" field 200 used to signal an RTS/CTS TXOP duration threshold to one or more STAs in accordance with an embodiment of the present disclosure.

In compliance with the IEEE 802.11 family Standards and Specifications, several types of management frames transmitted from the AP include a "TXOP Duration RTS Threshold" subfield in the "HE Operation Element" field. Such frames include beacon frames, association response frames, reassociation response frames, and probe response frames, etc. The different types of broadcast frames may have the functions and formats that are well known in the art unless otherwise specified herein. FIG. 2 illustrates an exemplary format of a management frame that includes a subfield 211 in an "HE operation element" field 200 used to signal an RTS/CTS TXOP duration threshold to one or more STAs in accordance with an embodiment of the present disclosure.

The "HE Operation Element" field 200 includes an element ID field 211, a length field 212, an element ID extension field 213, an "HE Operation Parameters" field 214, a BSS color information field 215, a basic HE Modulation and Coding Scheme (MCS) and Number of Spatial Streams (NSS) set field 216, a Very High Throughput (VHT) operation information field 217 and a maximum co-hosted BSSID indicator field 218.

The "HE Operation Parameters" field 214 includes a "TXOP Duration RTS Threshold" subfield 221, which can be used to indicate a duration threshold setting for one or more STAs. In the case that "HE Operation Element" 200 is contained in a management frame that is broadcast or multi-cast to multiple STAs, the field 221 may indicate "0," a non-zero value, or "1023." All the STAs that receive the management frame uniformly respond to the indication in the field 221 by performing one of the following: (1) keeping the respective previous values of their duration threshold parameter "dot11TXOPDurationRTSThreshold", which may be the individualized thresholds set in the association request response frames as described above; (2) updating the parameter to the non-zero value specified in the field 221; and (3) disabling RTS/CTS exchange.

On the other hand, in the case that "HE Operation Element" 200 is contained in a management frame that is solely destined to, or unicast to, a particular STA, the field 221 is utilized to specify an individualized duration threshold value for the STA. Such a management frame may be an association request response frame, a reassociation request response frame, a probe request response frame, etc.

In some embodiments, when the TXOP duration-based RTS/CTS exchange is enabled at an STA and certain conditions are met, it is mandatory that the STA initiate an RTS/CTS TXOP by using an RTS/CTS exchange. For example, the conditions for mandatory TXOP initiation are: (1) individually addressed frames are to be transmitted to the AP or to a TDLS peer STA; and (2) the expected TXOP duration is greater than or equal to the value of the duration threshold parameter multiplied by a coefficient. For example, the coefficient may be equal to 32 μs.

Figure 3:
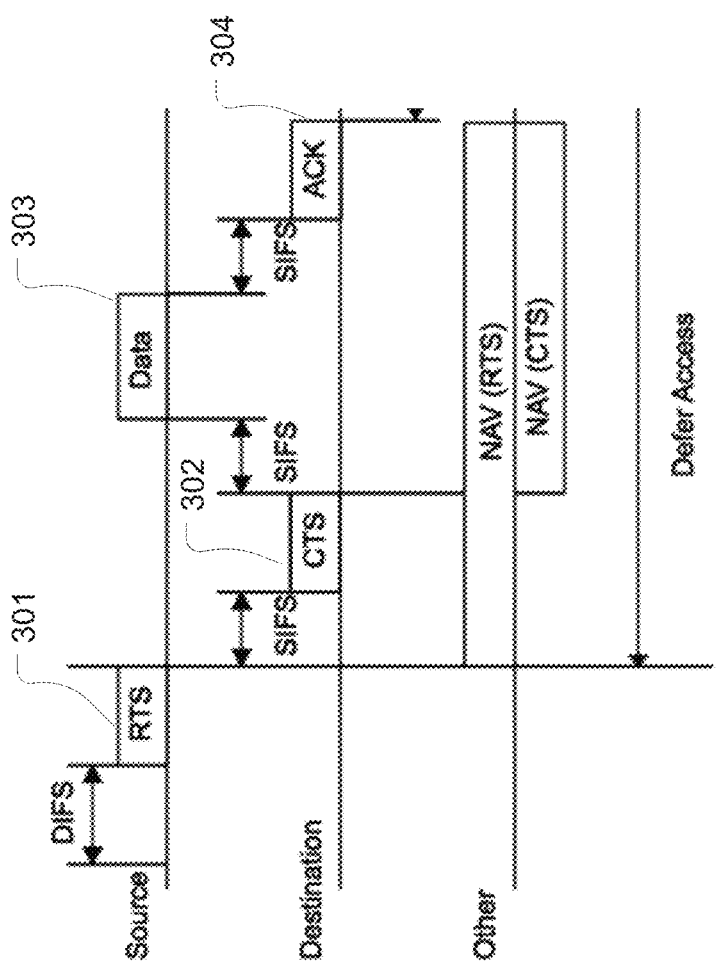
FIG. 3 is a timing diagram illustrating an exemplary computer controlled process of message exchanges in a RTS/CTS transmission in accordance with an embodiment with an embodiment of the present disclosure.

Once the STA decides to transmit a data frame to a destination STA by using RTS/CTS, it starts with exchanging RTS/CTS frames prior to data transmission. The destination STA may be the AP or a peer STA. FIG. 3 is a timing diagram illustrating an exemplary process of message exchanges in a RTS/CTS transmission in accordance with an embodiment of the present disclosure.

In an attempt to request an RTS TXOP and following a Distributed coordination function (DCF) Interframe Space (DIFS), the source STA transmits an RTS frame 301. The RTS frame 301 specifies the transmitter STA address and a duration, where the duration corresponds to an estimated time required to transmit the data frame 303. The estimated time includes time for the CTS frame 302, the acknowledge frame (ACK) 304 and the SIFSs associated therewith.

When the RTS frame 301 is received by the destination STA, it responds with the CTS frame 302 after an SIFS. If the medium is idle, the CTS signals the source STA that it can transmit a data frame. The CTS takes the transmitter address from the RTS frame and sets it as a receiver address. The CTS frame 302 also specifies a duration, which equals to the duration specified in the RTS frame adjusted by subtraction of an SIFS and the time required to transmit the CTS frame itself. Once the source STA receives the CTS frame 302, it starts to transmit the data frame 303 following a SIFS. The destination STA then sends back an ACK frame 304 to confirm receipt of the data frame 303. If a data frame is a fragmented data unit, the data frame and ACK frames specify the total duration of the next fragment and the related acknowledgment plus SIFSs.

The duration set in the RTS frame 301 or the CTS frame 302 are used by other STAs to update their Network Allocation Vector (NAV) to indicate that the medium is busy, and these STAs should defer access to the medium until the end of the ACK frame.

Figure 4:
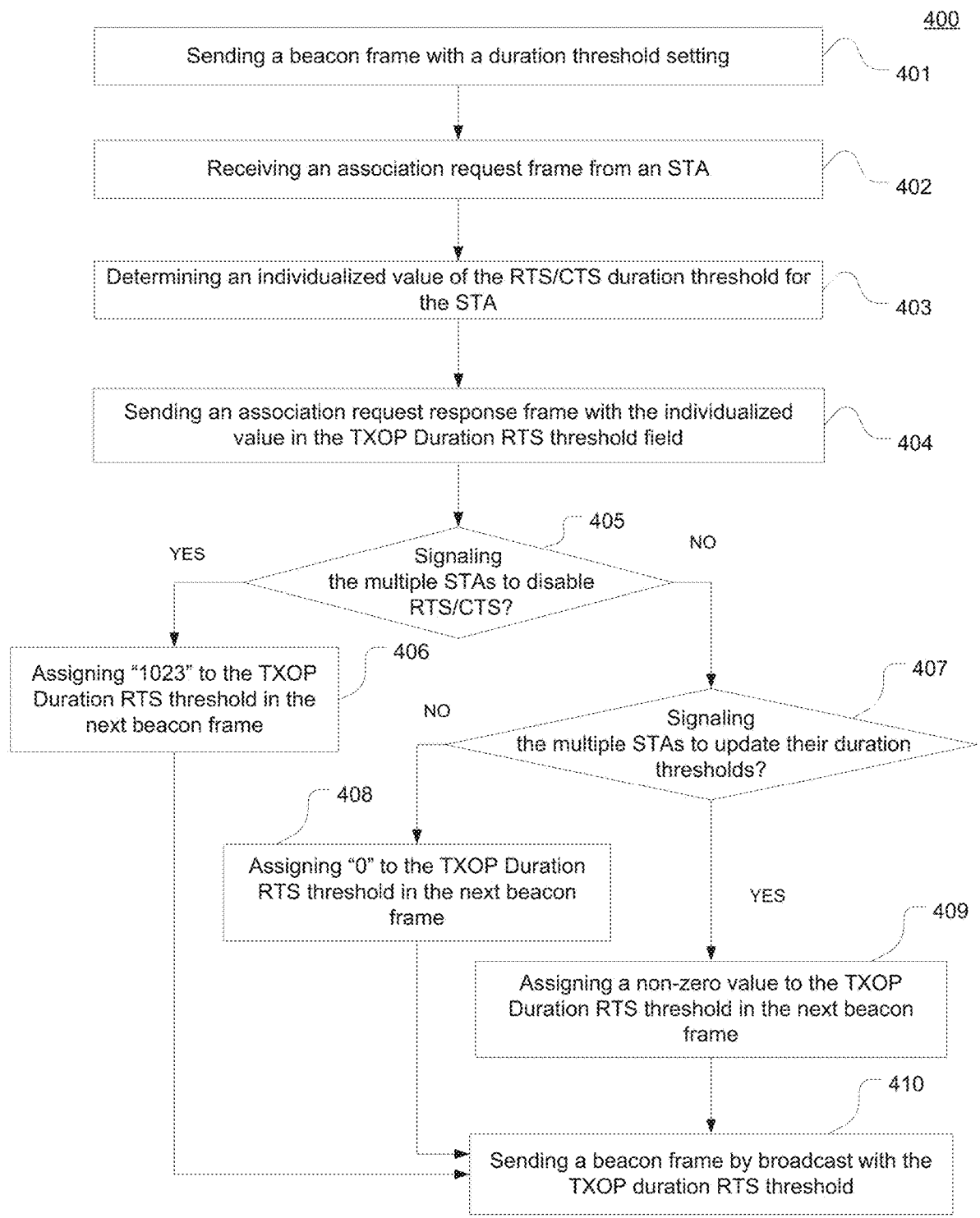
FIG. 4 is a flow chart depicting an exemplary computer controlled process of individually managing RTS/CTS duration thresholds for multiple STAs in a WLAN in accordance with an embodiment of the present disclosure.

FIG. 4 is a flow chart depicting an exemplary process 400 of individually managing RTS/CTS duration thresholds for multiple STAs in a WLAN in accordance with an embodiment of the present disclosure. Process 400 may be computer controlled and performed by an AP in the WLAN. At 401, the AP broadcasts or multi-casts a beacon frame to a plurality of STAs. The beacon frame includes a duration threshold setting, e.g., specified in the "HE Operation Element field" of the frame. The duration setting provides one of three possible indications to the receive STAs: no update on the duration threshold parameter, update to a non-zero value, and disabling RTS/CTS. According to this setting, the plurality of STAs act uniformly with respect to their duration threshold parameter.

At 402, the AP receives an association request frame from a new STA for joining the BSS. At 403, the AP determines an individualized value of the RST/CTS TXOP duration threshold for the STA. At 404, the AP sends an association request response frame to the STA, enclosing the individualized value of the duration threshold.

In a subsequent broadcast or multi-cast beacon frame, the AP determines, again, whether to uniformly change the duration threshold settings for the multiple STAs including the new STA. Particularly, at 405, the AP determines whether to signal all the STAs to disable RTS/CTS transmissions. If yes, at 406, the AP assigns the prescribed fixed value "1023" to the TXOP duration RTS threshold field (or the duration threshold field) in the next beacon frame. If not, at 407, the AP further determines whether to signal all the STAs to update their duration threshold parameter.

If yes, at 409, the AP assigns a non-zero value that is less than 1023 to the TXOP duration RTS threshold field in the next beacon frame. If not, the AP assigns a zero value to the TXOP duration RTS threshold field. At 410, the AP generates and sends a beacon frame by broadcast or multicast with the duration threshold setting therein.

Figure 5:
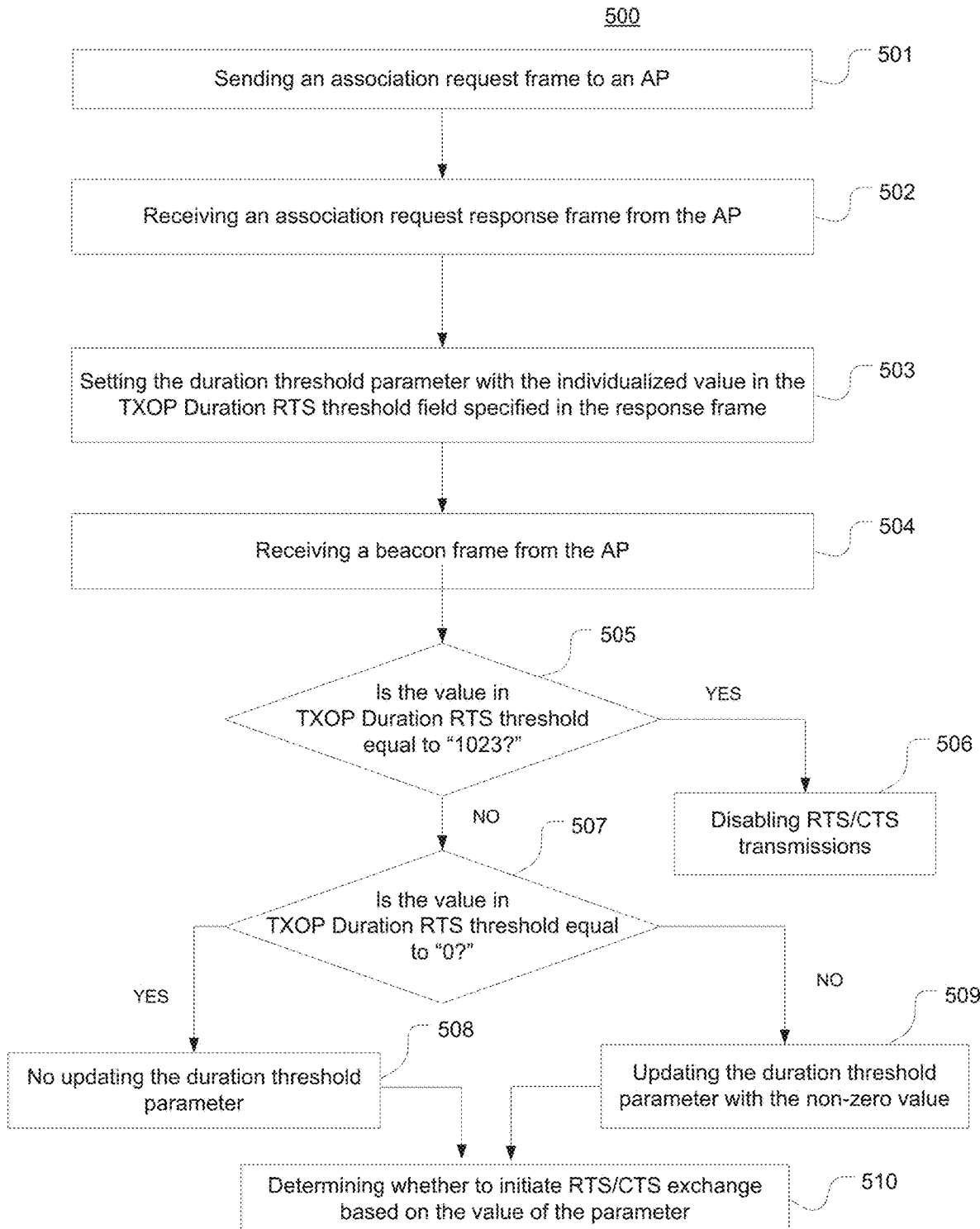
FIG. 5 is a flow charting depicting an exemplary process of maintaining a duration threshold parameter in response to AP instructions in accordance with an embodiment of the present disclosure.

FIG. 5 is a flow charting depicting an exemplary process 500 of maintaining a duration threshold parameter in response to AP instructions in accordance with an embodiment of the present disclosure. Process 500 may be computer controlled and performed by a non-AP STA. At 501, the STA sends an association request frame to the AP for joining the BSS. At 502, the STA receives an association request response frame from the AP with a duration threshold that is specific to the STA. At 503, the STA sets its duration threshold parameter (e.g., "dot11TXOPDurationRTSThreshold") to the specified value in the response frame.

At 504, the STA receive a beacon frame from the AP. At 505, the STA determines if the duration threshold field indicates a value of "1023." If yes, at 506, the STA disables RTS/CTS transmissions and therefore does not initiate any RTS/CTS exchange. If no, at 507, the STA further determines whether the duration threshold field indicates "0." If yes, the duration threshold parameter is not updated but rather preserves the last-updated value. If the duration threshold field indicates a non-zero value that is different than 1023, at 509, the STA updates its duration threshold parameter to the non-zero value. Based on the current value of the duration threshold parameter, the STA applies a set of policies to determine whether to initiate an RTS/CTS exchange.

Figure 6:
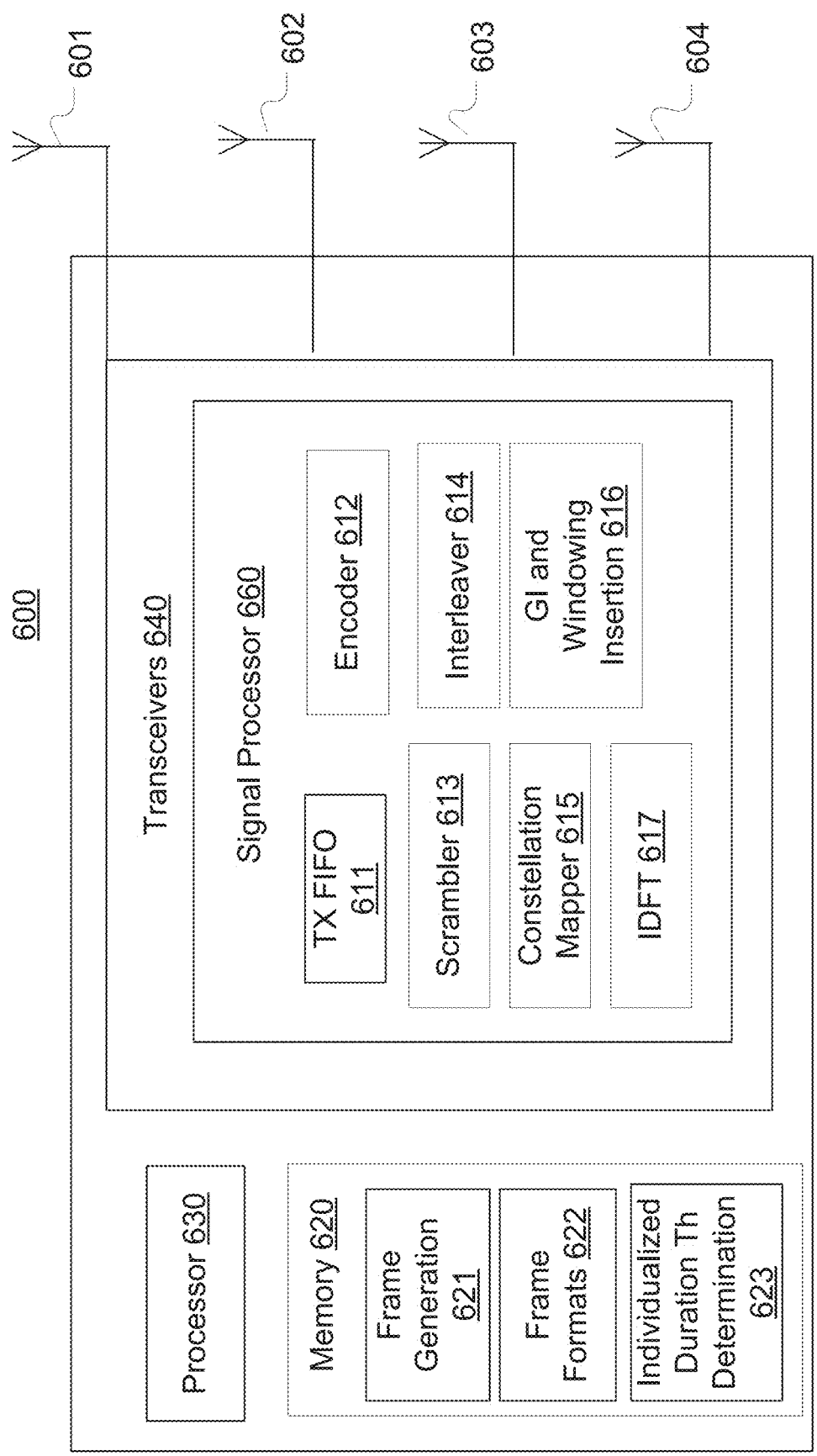
FIG. 6 is a block diagram illustrating an exemplary wireless communication device capable of managing the RTS/CTS TXOP duration thresholds for a plurality of STAs in an individualized manner in accordance with an embodiment of the present disclosure.

In some embodiments, processes 400 and 500 can be implemented as software logic, hardware logic, or a combination thereof. FIG. 6 is a block diagram illustrating an exemplary wireless communication device 600 capable of managing the RTS/CTS TXOP duration thresholds for a plurality of STAs in an individualized manner in accordance with an embodiment of the present disclosure. The communication device 600 may be configured as an AP and may be an STA device having a transceiver configured for data communication and WLAN management, e.g., a router, a general purpose computer, a smart phone, a portable electronic device, a tablet wearable device, a sensor used on Internet of Things (IoT), and etc.

The device 600 includes a main processor 630, a memory 620 and a transceiver 640 coupled to an array of antenna 601-604. The memory 620 stores the frame generation module 621 and frame format module 622 in compliance with various communication protocols and standards. The frame format module 522 stores the formats and field definitions of various types of frames that can be transmitted from or received by the AP, including beacon frames, association request frame, association request response frame, RTS frames, CTS frames, and etc. Particularly, the frame format module 622 stores the formats of signaling individualized duration thresholds in some frames and signaling uniform duration threshold settings to multiple STAs in some other frames as described in detail with reference to FIGS. 1-5.

In addition, the memory 620 stores processor-executable instructions that implement a duration threshold determination module 623. The module 623 may use any suitable determination algorithms, methods, factors or policies to determine an individualized duration threshold for an STA or a type of STAs without departing from the scope of the present disclosure. The module 623 is also capable of determining a duration threshold setting in a beacon frame to cause multiple STAs to act uniformly.

The transceiver 640 includes a signal processor 660 having various modules of the transmit path which is configured to generate beacon frames, association request response frames, data frames or any other type of communication transmission units. For instance, the signal processor 660 includes a transmit First-In-First-Out (TX FIFO) 611, an encoder 612, a scrambler 613, an interleaver 614, a constellation mapper 615, an inversed discrete Fourier transformer (IDFT) 617, and a guard interval (GI) and windowing insertion module 616. The signal processor 650 also includes a receive path that is similar as the one shown in the signal processor 750 in FIG. 7. Detailed illustration and description of the receive path in device 600 are omitted for brevity.

Figure 7:
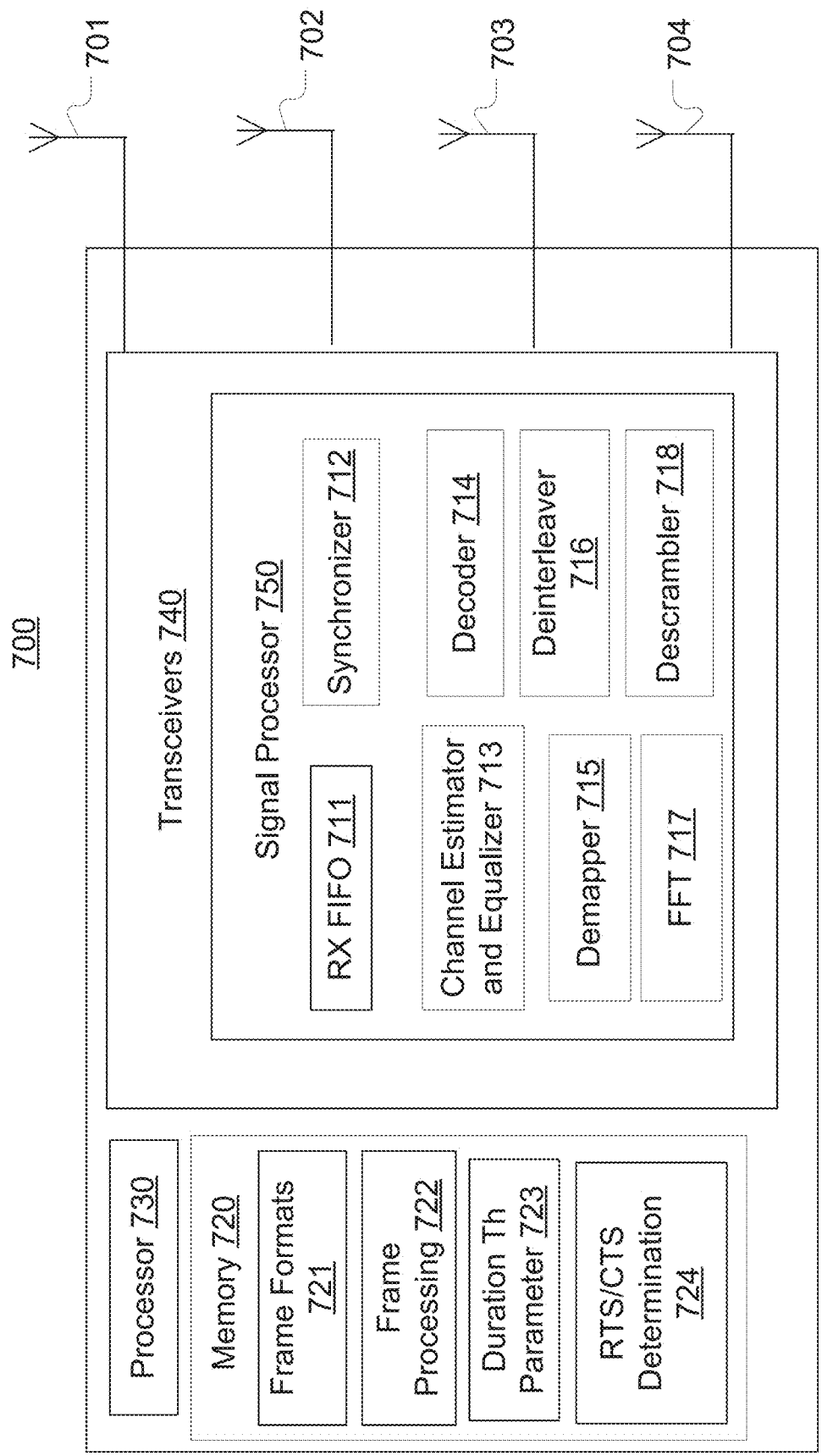
FIG. 7 is a block diagram illustrating the configuration of an exemplary wireless communication device capable of maintaining a duration threshold parameter for RTS/CTS transmission according to an embodiment of the present disclosure.

FIG. 7 is a block diagram illustrating the configuration of an exemplary wireless communication device 700 capable of maintaining a duration threshold parameter for RTS/CTS transmission according to an embodiment of the present disclosure. The device 700 may be a non-AP STA configured for data communication, e.g., a general purpose computer, a smart phone, a portable electronic device, a tablet wearable device, a sensor used on Internet of Things (IoT), and etc.

The device 700 includes main processor 730, a memory 720 and a transceiver 740 coupled to an array of antenna 701-704. The transceiver 740 includes a signal processor 750 having various modules of the receive path which is configured to process communication transmission units. For instance, the signal processor 710 includes a receive First-In-First-Out (RX FIFO) 5711, a synchronizer 712, a channel estimator and equalizer 713, a decoder 714, a demapper 715, a deinterleaver 716, a fast Fourier transformer (FFT) 717, and a descrambler 718. The signal processor 750 also includes a transmit path that is similar as the one shown in the signal processor 650 in FIG. 6. Detailed illustration and description of the transmit path in device 700 are omitted for brevity.

The memory 720 stores the frame format module 721 in compliance with various communication protocols and standards. The frame format module 721 stores the formats and field definitions of various types of frames that can be transmitted from or received by the STA, as described in detail with reference to FIGS. 1-5.

The frame processing module 722 stores processor-executable instructions for resolving various frames, including resolving the duration threshold fields in beacon frames and association request response frames, as described in detail with reference to FIGS. 1-5. The duration threshold parameter 723 may be set or updated in response to association request response frames and beacon frames. The RTS/CTS determination module 724 stores the policies governing mandatory or optional RTS/CTS transmissions and can apply the policies to determine whether the current duration threshold value dictates initiation of a RTS/CTS transmission.

It will be appreciated that each of the signal processors in FIG. 6 and FIG. 7 may include a wide range of other suitable components that are well known in the art. The various components can be implemented in any suitable manner that is well known in the art and can be implemented using hardware logic, software logic or a combination thereof.

Embodiments of the present disclosure further provide mechanisms to facilitate HE duration-based RTS/CTS transmission in the Reverse Direction (RD) protocol. Generally, the RD protocol can improve data transfer efficiency between devices during a TXOP by eliminating the need for either device to initiate a new data transfer. Without the RD protocol, each uni-directional data transfer required the initiating station to capture (and possibly reserve time on) a contention-based RF medium. With the RD protocol, once the transmitting station has obtained a TXOP, it may essentially grant permission to the other station to send information back during its TXOP.

Two roles need to be defined in RD protocol transmission: RD initiator and RD responder. The RD initiator sends its permission to the RD responder using a Reverse Direction Grant (RDG) in the "RDG/More PPDU" field of the "HT Control" field in the MAC frame. This bit is used by the RD initiator for granting permission (RDG) to the RD responder, and it is used by the RD responder to signal whether or not it is sending more frames immediately following the one just received (More PPDU).

According to embodiments of the present disclosure, in compliance with the IEEE 802.11 family Standards and Specifications, an HT STA indicates support of the RD feature as an RD responder using an "RD Responder" subfield of the "HT Extended Capabilities" field of the "HT Capabilities Element." The STA sets the "RD Responder" subfield to "1" in frames that it transmits containing the "HT Capabilities Element" if the "dot11RDResponderOptionImplemented" field indicates "true." Otherwise, the STA sets the "RD Responder" subfield to "0." In a non-HE HT STA, the "RDG/More PPDU" subfield and the "AC Constraint" subfield are encompassed in the "HTC" field. In an HE STA the "RDG/More PPDU" subfield and the "AC Constraint" subfield are encompassed in the command and status control subfield ("CAS Control").

As for an RD initiator, transmission of a high throughput control (+HTC) or directional multi-Giga-byte (DMG) frame by an RD initiator with the "RDG/More PPDU" subfield indicating "1" (either transmitted as a nonaggregate medium access control (MAC) protocol data unit (non-A-MPDU), as an S-MPDU, or within an A-MPDU) indicates that the duration indicated by the "Duration/ID" field is available for the RD response burst and RD initiator final PPDU (if present). Transmission of an MPDU by an HE RD initiator indicates that the duration indicated by the "Duration/ID" field is available for the RD response burst and RD initiator final PPDU (if present), where the MPDU contains a "CAS Control" subfield with the "RDG/More PPDU" subfield equal to 1.

In a frame transmitted during a TXOP, besides setting the "RDG/More PPDU" field to 1 in a "CAS Control" subfield, an HE STA RD initiator may set the "AC Constraint" subfield in the "CAS Control" subfield to 1.

As for an RD responder, if the "AC Constraint" subfield is equal to 1 in last frame received from an RD initiator, the following two rules apply. First, a non-HE RD responder transmits data frames of only the same AC as the last frame received from the RD initiator. Second, an HE RD responder may transmit an A-MPDU with or multi-traffic identifier (TID) A-MPDU with MPDUs from one or more ACs that have a priority that is equal to or higher than the lowest priority AC of the MPDU(s) carried in the last PPDU received from the RD initiator.

If the "AC Constraint" subfield is equal to 0, the RD responder may transmit Data frames of any TID.

The RD responder may send a Trigger frame for soliciting an Uplink Multi-User MIMO/OFDMA PPDU from one more non-AP STAs, when the RD responder receives a frame from the RD initiator where the "AC Constraint" subfield in the "CAS Control" subfield in the frame is set to 0. Because the Uplink Multi-User MIMO/OFDMA PPDU solicited from the RD responder can contains MPDUs from any TID, the RD initiator that sets the "RDG/More PPDU" field to 1 in a frame transmitted during a TXOP sets the "AC Constraint" subfield in the "CAS Control" subfield to 0 when the RD initiator grants a Trigger frame transmission from the RD responder.

The RD responder should not send a Trigger frame, when the RD responder received a frame from the RD initiator where the "AC Constraint" subfield in the "CAS Control" subfield in the frame is set to 1.

When the RD initiator exchanges RTS/CTS frames, the RD initiator that sets the "RDG/More PPDU" field to 1 in a "CAS Control" subfield in a frame transmitted during a TXOP should not set the AC Constraint sub-field in the "CAS Control" subfield to 0 for granting a Trigger frame transmission from the RD responder.

Because the RTS/CTS frames exchange sets the NAV of non-AP STAs, it may prohibit non-AP STAs from transmitting an Uplink Multi-User MIMO/OFDMA PPDU.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of wireless communication performed by a first station (STA), the method comprising:
    at the first station (STA) transmitting an association request for receipt by a second STA for joining a Basic Service Set (BSS);
    receiving an association response from the second STA, wherein the association response specifies a first duration threshold for an RTS/CTS data transmission, and wherein the first duration threshold is specific to the first STA;
    setting a duration threshold parameter of the first STA to the first duration threshold;
    receiving a management frame from the second STA, wherein the management frame is transmitted by the second STA and comprises a first duration threshold field; and
    in response to detecting that the first duration threshold field in the management frame indicates a value of zero, preserving the first duration threshold for the duration threshold parameter of the first STA.

2. The method of claim 1 further comprising, in response to detecting that the first duration threshold field in the management frame indicates a different value that is different than a first prescribed constant value, updating the value of the duration threshold parameter to the different value, wherein the different value is smaller than a second prescribed constant value.

3. The method of claim 1, wherein: the association request is comprised in an association request frame; and the association response is comprised in an association response frame received by the first STA.

4. The method of claim 1, wherein the management frame comprises a high energy (HE) operation element, and wherein the first duration threshold field is a duration-based RTS threshold field.

5. The method of claim 3, wherein the management frame comprises a beacon frame, and wherein the duration threshold parameter comprises dot11TXOPdurationRTSThreshold substantially in compliance with an IEEE 802.11 family standard.

6. The method of claim 2, further comprising initiating a RTS/CTS data transmission in response to a determination that:
    individually addressed frames are to be transmitted from the first STA to the second STA or to a Tunneled Direct Link Setup (TDLS) peer STA; and
    a duration for the RTS/CTS data transmission is greater than or equal to the value of the duration threshold parameter multiplied by a predetermined coefficient,
    and wherein the initiating comprises:
    transmitting an RTS frame to the second STA; and
    receiving a CTS frame from the second STA.

7. The method of claim 2, further comprising disabling RTS/CTS data transmission responsive to a determination that the duration threshold parameter is equal to the second prescribed value.

8. The method of claim 1, wherein the second STA comprises an access point (AP) STA and the first STA comprises a non-AP STA.

9. A method of wireless communication performed by a first station (STA), the method comprising:
    receiving an association request from a second STA for joining a Basic Service Set (BSS);
    transmitting an association response to the second STA, wherein the association response specifies a first value for the second STA, wherein the first value in the association response is operable to signal the second STA to set an RTS duration threshold parameter to the first value;
    subsequent to the transmitting the association response, generating a management frame, wherein the management frame comprises a first RTS duration threshold field; and
    transmitting the management frame for receipt by the second STA, and
    wherein a first prescribed constant value set in the first RTS duration threshold field signals a plurality of STAs to preserve an RTS duration threshold parameter when the first prescribed constant value is zero, and wherein a value different than the first prescribed constant value signals the plurality of STAs to update the RTS duration threshold parameter to the different value.

10. The method of claim 9, wherein: the association request is comprised in an association request frame received by the first STA; and the association response is comprised in an association response frame transmitted by the first STA.

11. The method of claim 9, wherein the management frame comprises a high energy (HE) operation element, and wherein the first duration threshold field is a duration-based RTS threshold field comprised in the HE operation element.

12. The method of claim 9, wherein the management frame comprises a beacon frame, and wherein the RTS duration threshold parameter comprises dot11TXOPdurationRTSThreshold substantially in compliance with an IEEE 802.11 family standard.

13. The method of claim 9, wherein a second prescribed constant value in the first RTS duration threshold field is operable to signal the plurality of STAs to disable RTS/CTS data transmissions, and the second prescribed constant value is a non-zero constant.

14. The method of claim 9, wherein the first STA comprises an access point (AP) STA and the second STA comprises a non-AP STA.

15. A wireless communication device configured as a first station (STA), the wireless communication device comprising:
 a wireless transceiver; and
 a processor that causes the wireless transceiver to perform a method of wireless communication with a second STA, the method comprising:
  sending an association request for receipt by the second STA for joining a Basic Service Set (BSS);
  receiving an association response from the second STA, wherein the association response specifies a first duration threshold for an RTS/CTS data transmission, wherein further the first duration threshold is specific to the wireless communication device;
  setting a duration threshold parameter of the first STA to the first duration threshold;
  receiving a management frame from the second STA, wherein the management frame is transmitted by the second STA and comprises a first duration threshold field; and
  in response to detecting that the first duration threshold field in the management frame indicates a value of zero, preserving the first duration threshold for the duration threshold parameter.

16. The wireless communication device of claim 15, wherein the method further comprises, in response to detecting that the first duration threshold field in the management frame indicates a different value than the first prescribed constant value, updating the value of the duration threshold parameter to the different value, wherein the different value is smaller than a second prescribed constant value.

17. The wireless communication device of claim 15, wherein:
 the association request is comprised in an association request frame;
 the association response is comprised in an association response frame;
 the management frame comprises a high energy (HE) operation element; and
 the first duration threshold field is a duration-based RTS threshold field.

18. The wireless communication device of claim 17, wherein the management frame comprises a beacon frame, and wherein the duration threshold parameter comprises dot11TXOPdurationRTSThreshold in compliance with an IEEE 802.11 family standard.

19. The wireless communication device of claim 15, wherein the method further comprises initiating an RTS/CTS data transmission in response to a determination that:
 individually addressed frames are to be transmitted from the first STA to the second STA or to a Tunneled Direct Link Setup (TDLS) peer STA; and
 a duration for the TRS/CTS data transmission is greater than or equal to the value of the duration threshold parameter multiplied by a predetermined coefficient, and wherein the initiating comprises:
 transmitting an RTS frame to the second STA; and
 receiving a CTS frame from the second STA, and wherein the second STA is an access point (AP) STA and the first STA is a non-AP STA.

20. The wireless communication device of claim 15, wherein the method further comprises disabling RTS/CTS data transmission responsive to a determination that the duration threshold parameter is equal to a second prescribed value or the duration threshold parameter comprises no value.

\* \* \* \* \*